United States Patent [19]
Weber

[11] 4,067,562
[45] Jan. 10, 1978

[54] ENCAPSULATION AND IMPREGNATION OF WINDINGS FOR MOTOR STATORS AND THE LIKE

[75] Inventor: Jack E. Weber, San Diego, Calif.
[73] Assignee: Motek, Inc., Newark, Del.
[21] Appl. No.: 576,307
[22] Filed: May 12, 1975
[51] Int. Cl.² .............................................. B23Q 1/04
[52] U.S. Cl. ...................................... 269/71; 118/503
[58] Field of Search ............................. 269/58, 60, 71; 118/503

[56] References Cited
U.S. PATENT DOCUMENTS

| | | | |
|---|---|---|---|
| 3,457,899 | 7/1969 | Kelch et al. | 118/503 |
| 3,814,413 | 6/1974 | Bopp | 269/71 |

*Primary Examiner*—Robert C. Watson
*Attorney, Agent, or Firm*—Connolly and Hutz

[57] ABSTRACT

Machine components such as windings of motor stators and the like are treated by totally impregnating and encapsulating the windings through the use of an apparatus on which the motor stator or the like may be selectively mounted on a platform in one of two positions 180° apart and then inclined downwardly from the horizontal with the motor stator then being rotated and the encapsulating fluid poured therein during rotation thereof. Rotation is continued until the thermosetting epoxy hardens, thus eliminating the tendency of the fluid material to drip off because of gravity.

22 Claims, 13 Drawing Figures

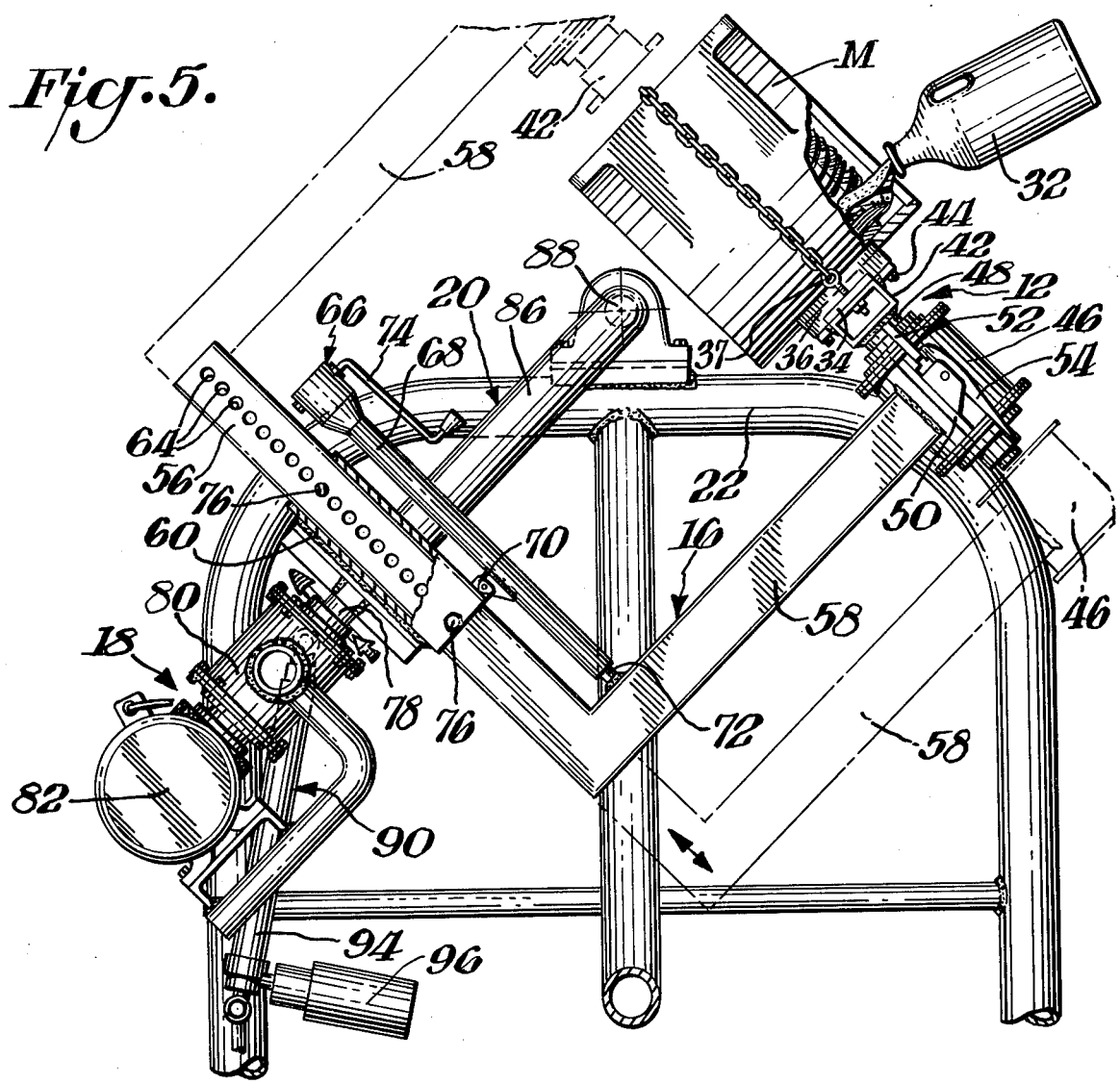
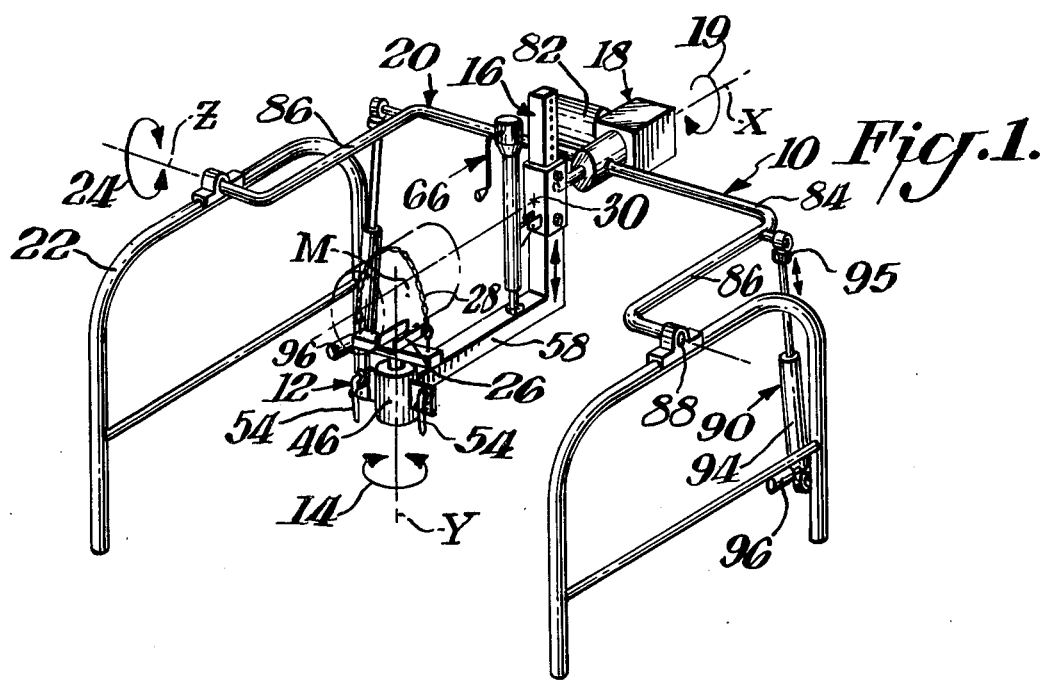

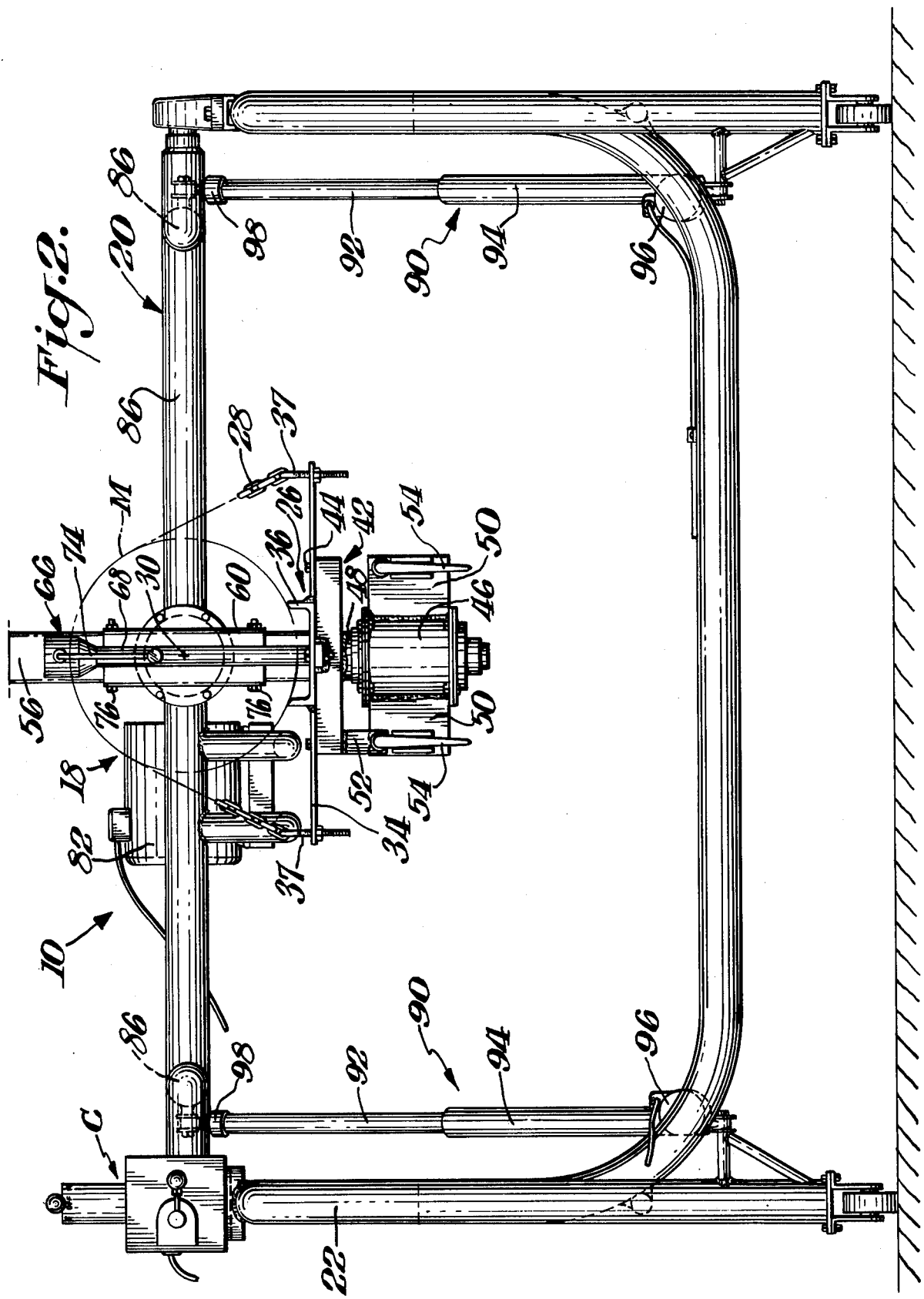

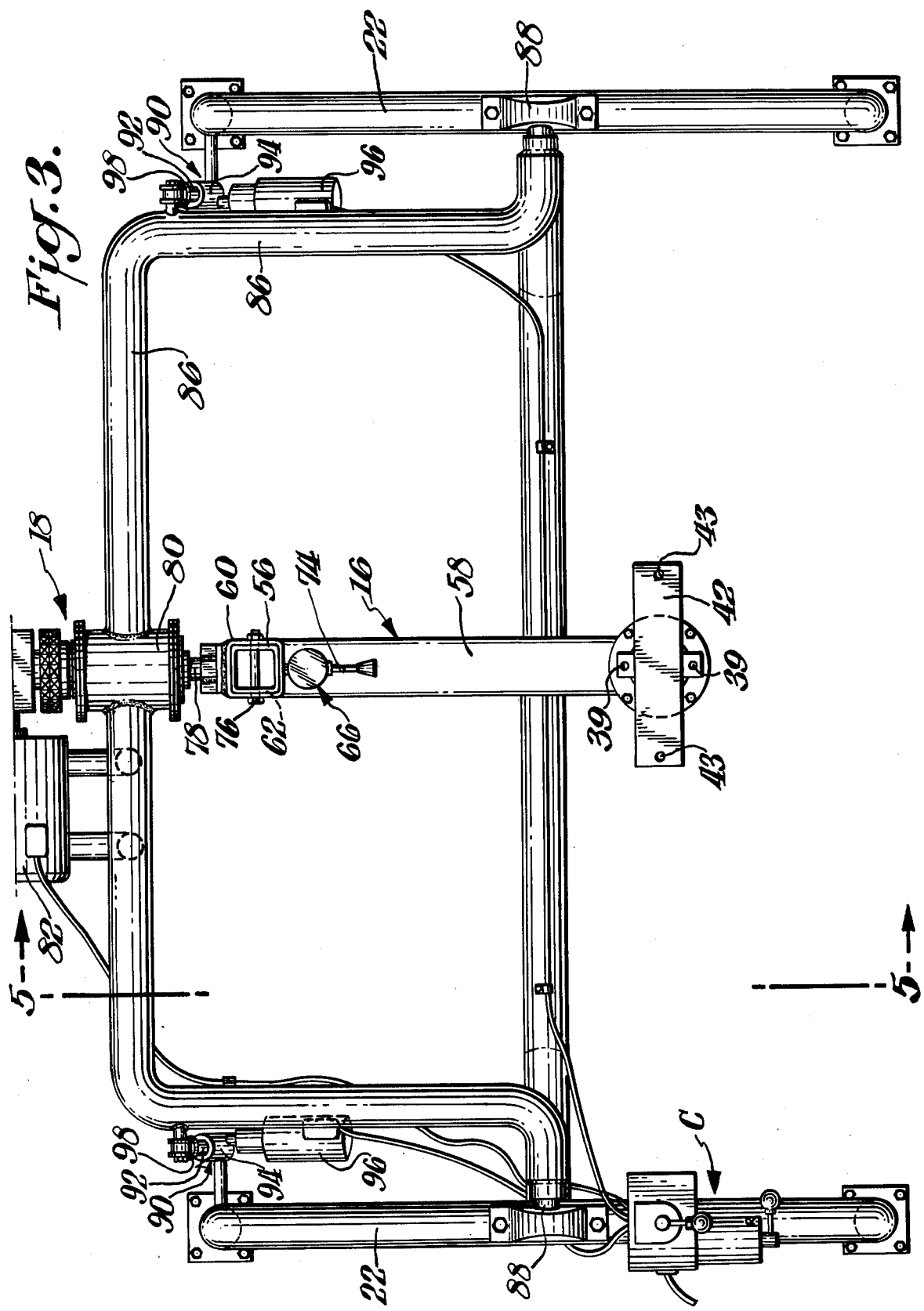

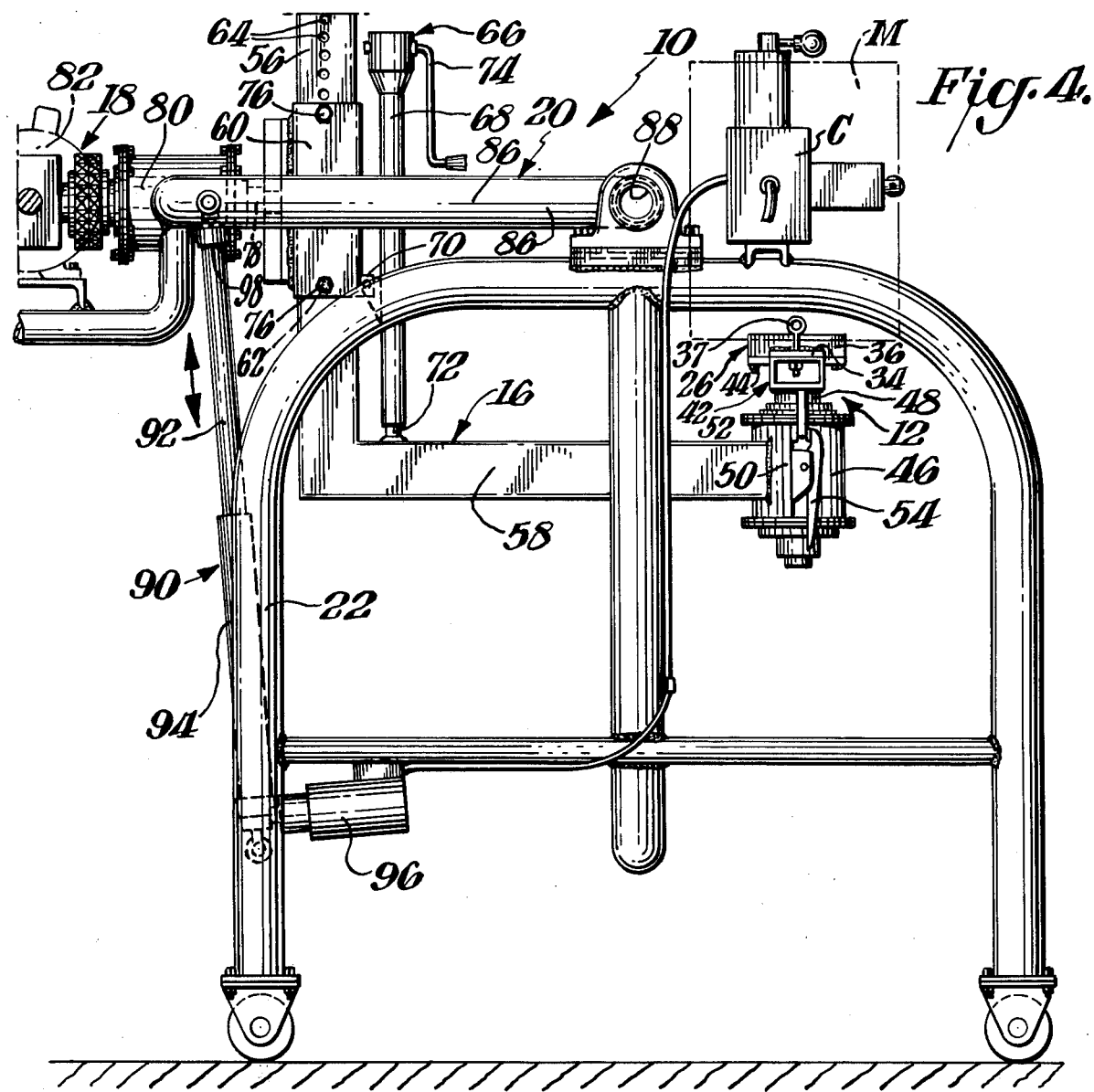
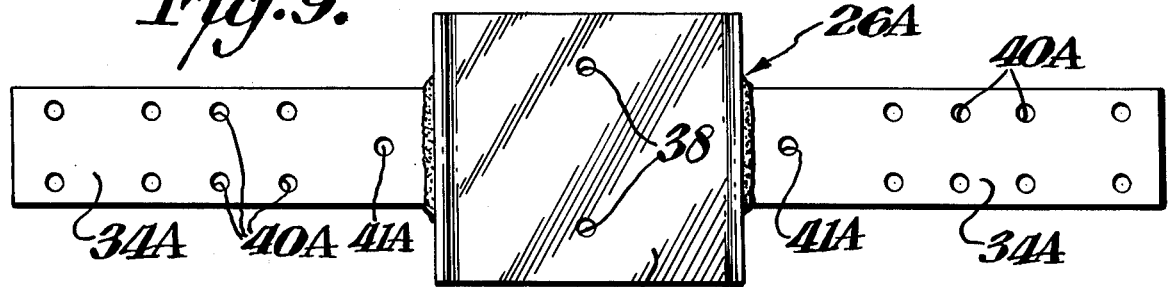
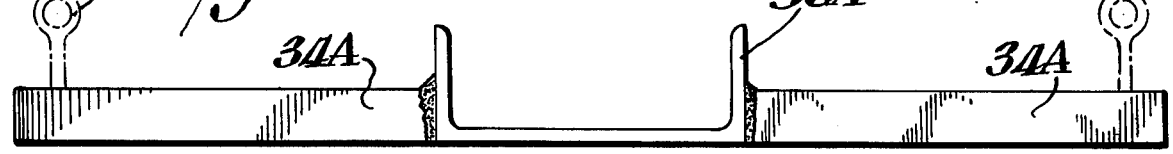

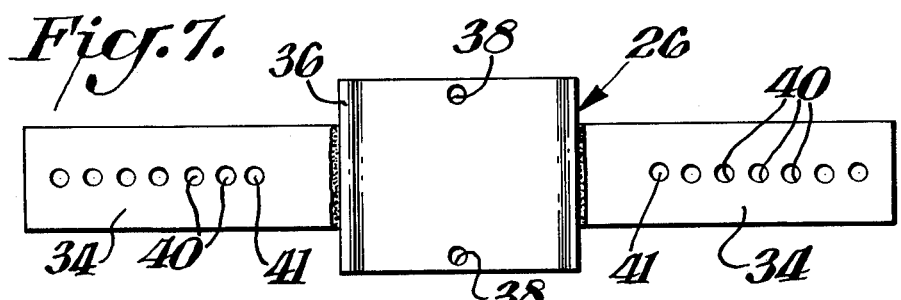
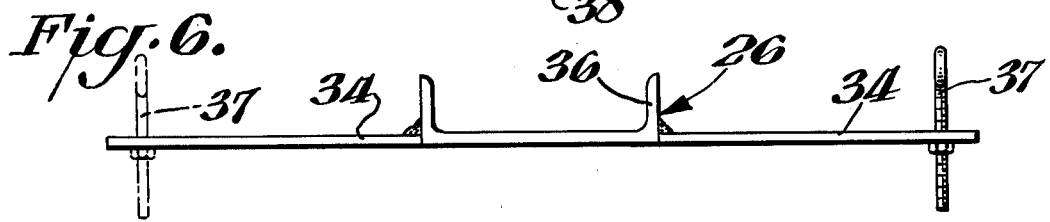
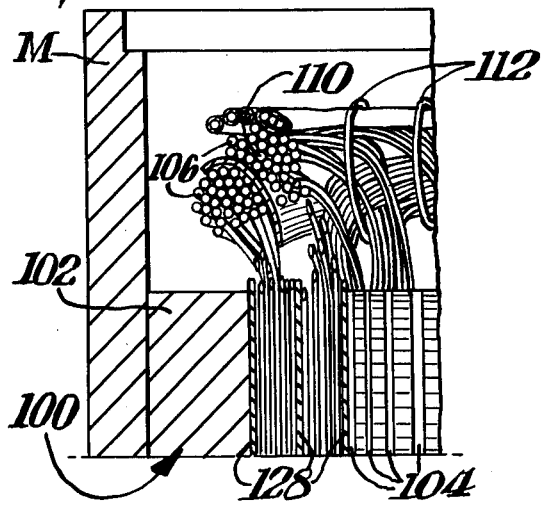
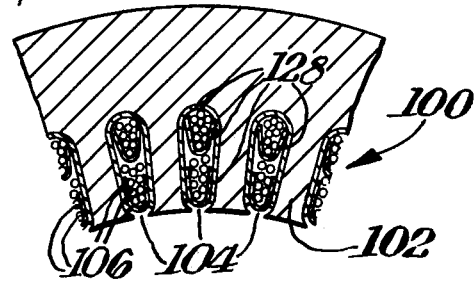
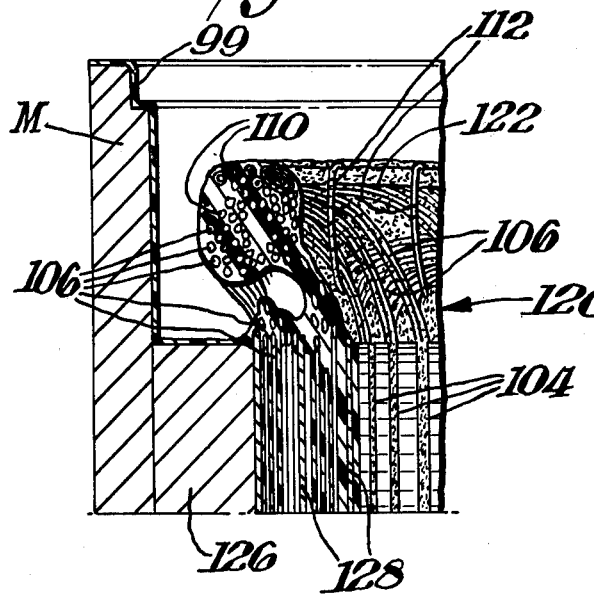
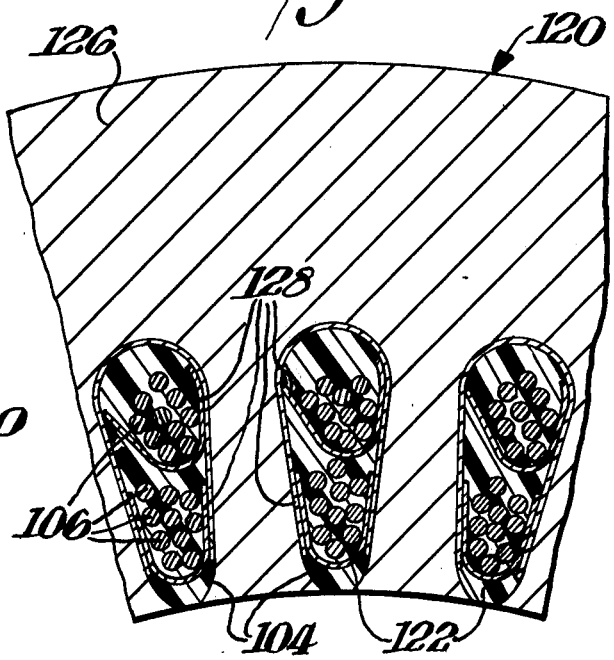

ENCAPSULATION AND IMPREGNATION OF WINDINGS FOR MOTOR STATORS AND THE LIKE

BACKGROUND OF THE INVENTION

This invention relates to the treating of machine components such as windings of motor stators and the like. The invention is concerned with new components or with components which have been used in service and are to be cleaned as well as components such as motor stators which have been completely burned out and are to be rewound. Such components may range from various size motors of, for example, five horsepower to 300 horsepower and the invention may equally apply to large industrial motors such as wound rotor motors used, for example, in water works as well as to components such as magnetic clutches.

Various attempts have been made in the prior art to rewind stators. It has been known, for example, to mount the stator in a horizontal position in a cabinet which is slightly tilted and then to rotate the motor when a coating material is applied thereto. Various prior art attempts have used hoses with nozzles attached thereto for applying the coating substance. A common approach taken by the prior art is to dip a hot motor in varnish and then bake the varnish thereon as a coating substance. Such a process frequently takes as long as 6 hours and generally the process requires a double dip and baking and in many instances the dipping may be repeated by as much as five times. The use of such expedients by the prior art is not only complicated and expensive but is very time consuming. Frequently, however, time is of the essence such as when a burned out motor must be replaced since the motor may be required in conjunction with other industrial processes.

The resultant motors of the prior art processes likewise have various disadvantages. In this respect such conventional motors include phase barrier material between the individual phase groups. Further, extensive lacing is required to hold the individual phase groups in place. Moreover, problems arise with conventional motors because of the dead air spaces in the slots which cause the heat of the wires to rise and lead to motor damage. Still further the prior art approaches which utilize varnish has the disadvantage that when the varnish is heated to evaporate the solvent, air spaces are created. A distinct disadvantage with any such air spaces is the generation of ozone which is a strong oxidizing agent and such ozone would be present in the air pockets.

SUMMARY OF THE INVENTION

An object of this invention is to provide improved technique for treating machine components such as for impregnating and encapsulating windings of motor stators and the like.

A further object of this invention is to provide such techniques whereby the treating process is substantially shortened in time.

A still further object of this invention is to provide such techniques wherein the resultant motor in itself is novel.

A yet further object of this invention is to provide such techniques whereby the resultant motor may be used in any type of environment.

In accordance with this invention machine components such as windings of motor stators and the like are treated by totally impregnating and encapsulating the windings through the use of an apparatus on which the motor stator or the like may be selectively mounted on a platform in one of two positions 180° apart and then inclined downwardly from the horizontal with the motor stator then being rotated and the encapsulating fluid poured therein during rotation thereof with rotation continued until the encapsulation fluid hardens.

The apparatus may include a removable jig or platform for holding the individual component such as the motor stator with the platform being mounted on a rotatable shaft secured to a generally horizontal leg of an L-shaped bracket which in turn has its vertical leg movably mounted in a sleeve fixed to a rotating mechanism. The rotating mechanism in turn is preferably secured to the bight of a U-shaped bracket pivotally mounted to the frame of the apparatus.

THE DRAWINGS

FIG. 1 is a perspective view schematically illustrating the concepts of this invention;

FIG. 2 is a front elevation view of an apparatus in accordance with this invention;

FIG. 3 is a top plan view of the apparatus shown in FIG. 2;

FIG. 4 is a side elevation view of the apparatus shown in FIGS. 2–3;

FIG. 5 is a cross-sectional view taken through FIG. 3 along the line 5—5;

FIG. 6 is an elevation view of a mounting platform usable with the apparatus of FIGS. 2–5 for a light motor;

FIG. 7 is a top plan view of the mounting platform shown in FIG. 6;

FIG. 8 is a side elevation view of an alternative mounting platform usable with the apparatus of FIGS. 2–5 for a heavy motor;

FIG. 9 is a top plan view of the mounting platform shown in FIG. 8;

FIG. 10 is a plan view in section of a portion of a prior art motor stator;

FIG. 11 is an elevation view in section of a portion of the prior art motor stator shown in FIG. 10;

FIG. 12 is a plan view in section of a portion of a motor stator in accordance with this invention; and FIG. 13 is an elevation view in section of a portion of the motor stator shown in FIG. 12.

DETAILED DESCRIPTION

FIG. 1 schematically illustrates an apparatus 10 incorporating the principles of this invention. As indicated therein, a machine component such as a motor stator M is shown in phantom secured to mounting means 12 which is rotatable about a first axis $y$ as indicated by the arrow 14 for selective movement to one of two positions 180° apart and accordingly the movement of mounting means may be considered as inverting means. The mounting means is secured to a bracket assembly 16 rotatably mounted by drive device 18 in the direction indicated by the arrow 19 about a second axis $x$. Bracket assembly 16 in turn is mounted on tilting assembly 20 which is pivotally connected to frame 22 for pivotal movement in the direction indicated by the arrow 24 about a third axis $z$.

In operation the motor stator is heated to, for example, 150° F in a conventional preheating oven. The heated motor M is placed on platform 26 the details of which will be later described. Selected portions of the motor stator are covered with a shielding material to prevent the later applied epoxy from adhering to those selected portions of the stator. For example, screw holes may be temporarily filled with bolts and a release agent 99 (FIG. 13) applied on surfaces which must be free of the epoxy. As later described the motor stator M is secured to the platform 26 by suitable fastening means such as straps which may be in the form of chains 28 wrapped around motor stator M.

In the meantime a suitable epoxy is prepared, preferably the epoxy is one which is self-setting or exothermic and cures after the individual components are mixed together. This is advantageously accomplished by packaging one of the components in a container 32 (FIG. 5). Container 32 has sufficient capacity to permit the other component to be poured into container 32 thus assuring the proper ratio of components and eliminating the possibility of human error in the ratio attainment. In this respect any other component used in the mixture would be prepackaged in another container which, with container 32, comprises a set that would be sold or packaged together. Container 32 has a spout of sufficient dimension to permit a stirring rod to be inserted therein and thus mix the components. This may be accomplished by inserting the stirring rod in a conventional hand electric drill to provide the necessary rotational movement. After stirring has been effected the same container 32 is used as an applicator, as shown in FIG. 5. This feature of using the same container for packaging, mixing and applicating has the further advantage of providing a ready means of determining how much epoxy has been used as indicated by the number of empty containers 32.

After motor stator M has been mounted in place, the center line of the machine motor stator M is visually aligned with the axis of rotation x of the bracket assembly 16. To facilitate such visual alignment a sight mark 30 may be provided. The alignment of the center line with the axis of rotation is particularly preferable for larger motors although not as necessary for smaller motors. If simply mounting the motor on the jig or platform 26 does not result in proper alignment of its center line, bracket assembly 16 may be adjusted as later described in detail to provide for such alignment. The next step is to incline the motor stator M so that upon later application of the epoxy, the epoxy will flow downwardly. This is accomplished by lowering the U-shaped mounting or bracket 20 to a suitable angle in accordance with the type of motor being treated. After the motor stator M is thus positioned, rotating mechanism 18 is actuated and bracket 16 rotates about its axis x. Since motor stator M is coaxially mounted with axis x its center line remains stationary while the motor stator itself rotates. During such rotation the operator pours the epoxy into the motor as best illustrated, for example, in FIG. 5. This is done by simply tilting an applicator such as a suitable container 32 which is otherwise held stationary. Although automatic feed means may be used, this invention particularly lends itself to manual feeding. The rotation of the motor stator, while the epoxy is being applied, results in an effective impregnation and encapsulation of the stator windings through the joint actions of gravity and capillary attraction with respect to the wires. Further, because the motor stator had been preheated the heat acts to cause a flowing of the heated epoxy. This process differs significantly from the prior art since the inventive process results in a true impregnation and encapsulation rather than a mere coating.

During application of the epoxy the remote end of the motor stator M acts as a cup for the flowing epoxy. This step is continued until there has been a substantial encapsulation of the motor windings which is visually apparent when the epoxy works its way through the slots of the motor stator and begins to drip from the motor stator. Rotation is continued in this position without further pouring of epoxy, for a sufficient period to permit the epoxy to gel. The stator is treated with a spatula to remove excess semi-liquid epoxy from the stator or inner surface and to spread the epoxy for cosmetic purposes and to reduce the amount which must be ground out for proper air gap clearance purposes. The jig or platform 26 is then rotated 180° while the stator continues to rotate to reverse the position of the motor stator.

The U-shaped bracket 20 is again lowered so that a similar second rotating action may be accomplished by the actuation of drive mechanism 18 to rotate L-shaped bracket assembly 16 and motor stator M held thereon. During this second rotating action additional epoxy is poured into the motor stator to assure complete encapsulation of the windings. When this step is completed, rotation is continued, U-shaped bracket 20 is raised to its horizontal position and the motor stator may again be treated to cosmetically spread the epoxy or remove any excess therefrom while it rotates in its horizontal position. The temporary shielding material is then removed to thus remove any undesired epoxy accumulation therefrom.

For certain type motors it is preferable to incline U-shaped bracket 20 downwardly to an angle of 45°. If the epoxy prematurely drips down the motor stator while the rotating motor stator is inclined at a particular angle, the angle can be adjusted to a lesser angle so that the epoxy can continue to be poured effectively onto the motor stator.

FIGS. 6–7 illustrate a jig or platform 26 which is particularly suitable for small motor stators. As indicated therein, the platform includes plate shaped base members 34 against which is mounted a second channel shaped receiving member 36. Receiving member 36 includes spaced apertures 38 while apertures 40, 41 are provided in flat base member 34. In operation the jig or platform 26 is detachably secured to support member 42 by suitable fasteners 44 (FIG. 5) through apertures 39 aligned with apertures 38 of receiving member 36 and apertures 43 aligned with corresponding apertures 41 of base member 34. The motor stator is placed in channel shaped receiving member 36 and secured thereto by straps in the form of chains 28, for example, which are secured to eyebolts 37 (shown in FIG. 6 but omitted from FIG. 7 for clarity of illustration) mounted in suitable sets of apertures 40 after being wrapped around motor stator M.

The advantage of a removable jig or platform is that different platforms may be used in accordance with different sized motors and suitably designed to securely accommodate its particular motor. Thus very small motors such as 5 horsepower to very large motors such as 300 horsepower may equally be treated. FIGS. 8–9, for example, illustrate a jig or platform 26A particularly designed for larger motors. Essentially other than differing in size, platform 26A differs from platform 26 by the inclusion of two rows of apertures 40A to accommodate a pair of chains and in the utilization of a stronger box shaped base member 34A. Because of the similarity of FIGS. 8-9 with respect to FIGS. 6-7 like reference numerals are used with the suffix "A: in FIGS. 8-9.

As previously indicated, the concepts of this invention are not limited to motor stators but may likewise apply to other machine components such as armatures, rotors, etc. If necessary other types of platforms or jigs may be suitabley provided for the particular component.

FIGS. 2, 4 and 5 illustrate additional details of the mounting means. As indicated therein, the mounting means includes a first support member 46 which is mounted at the end of the generally horizontal leg of L-shaped bracket assembly 16. Rotatable shaft 48 is secured to first support member 46 for rotation therein and second support member 42 is mounted on shaft 48 so that the motor stator may likewise be rotated. Stop means are provided for mounting motor stator M in one of two positions 180° apart. The stop means may take any suitable form but the illustrated embodiment includes a pair of metal abutments or stops 50 on the first support member 46 and a pair of metal lugs or stops 52 depending from the rotatable second support member 42 and movable into contact with fixed stops 50. Preferably, the lugs 52 include support cushions to prevent metal to metal contact. As is readily apparent, motor stator M may thus have its positions reversed by manually rotating the jig 26 until the lugs 52 contact respective stops 50. A lock mechanism such as a suitable toggle clamp 54 mounted on either first support 46 or second support 42 is then actuated for securing the first support 46 with second support 42 to hold the second support 42 immobile and its removable platform 26 is likewise held in place during application of the epoxy.

FIGS. 2-5 illustrate the details of a suitable L-shaped bracket assembly 16. As indicated therein, assembly 16 includes what may be considered a generally vertical leg 56 and a generally horizontal leg 58. The terms vertical and horizontal are used for reference sake only with respect to their orientation when the component is being mounted since during use of the apparatus the legs will actually be inclined. Mounting device 12 as previously noted is secured to the remote end of horizontal leg 58. A sleeve 60 is disposed over vertical leg 56 and so dimensioned that the leg may be moved up and down in sleeve 60. At least one aperture 62 is provided in sleeve 60 although preferably two such apertures are provided. Similarly, a set of spaced apertures 64 are provided in vertical leg 56 and arranged therein for alignment with respective apertures 62. The relative motion of vertical leg 56 is effectuated by a crank mechanism 66 which includes a housing 68 fixedly secured to sleeve 60 by suitable fasteners 70. Within the housing 66 is a vertically movable member such as a screw 72 which in turn is secured to horizontal leg 58. Rotation of crank arm 74 actuates a pinion (not shown) mounted on the crank arm shaft which engages screw 72 to raise or lower the L-shaped assembly with the vertical leg 56 being moved in sleeve 60. As previously noted, a sight marker 30 (FIGS. 2 and 5) is provided on crank housing 68 so that the center line of the motor stator may be visually aligned with the axis of rotation of the U-shaped bracket assembly 16. Obviously, if desired, the sight marker may be arranged on sleeve 60 itself or any other suitable location. When the position of motor stator M has been suitably adjusted by manipulation of crank mechanism 66 with suitable apertures 64 of vertical leg 56 being aligned with respective aperture 62 in sleeve 60, this vertical positioning is locked in place with suitable fasteners such as bolts 76 through the aligned apertures. As best shown in FIG. 3, sleeve 60 and vertical leg 56 are made of complementary non-circular cross-sectional shape such as by using square tubing to assure proper relative positioning of these parts and to prevent relative rotation therewith. As also shown in FIG. 3, sleeve 10 is mounted at the end of axle 78 which extends through bushing 80 and is driven in any suitable manner such as by air motor 82. By rotation of axle 78 the entire bracket assembly 16 is caused to rotate which in turn rotates the motor stator mounted thereon.

FIGS. 2-5 illustrate the details of U-shaped tiltable mounting 20. As illustrated therein, tiltable mounting 20 includes a U-shaped member having a bight portion 84 and a pair of legs 86. The ends of legs 86 are pivotally mounted to the frame proper 22 as indicated at 88. Bracket assembly 16 in turn is secured to the tiltable mounting 20 by means of bushing 80 to which bight portion 84 is secured by welding or other suitable means. A pinion and screw assembly 90 is secured at one end at each juncture of leg 86 with bight piston 84 and the remote end of each pinion and screw assembly 90 is fastened to frame 22. By extension of each screw 92 from its cylinder 94 tiltable mounting 20 is pivoted upwards and conversely by retraction of the screws 92 tiltable mounting 20 is pivoted downwardly. The pinion and screw assemblies 90 are pivotally mounted to the frame and to the U-shaped bracket to permit extension and retraction without binding. The dimensions of the pinion and screw assemblies 90 are such that upon full extension of screws 92 U-shaped bracket 20 is disposed in a horizontal position and similarly upon full retraction of the pistons 92 U-shaped bracket 20 is disposed at a 45° angle. Preferably an electric motor 96 is utilized for operation of pinion and screw assemblies 90 with a conventional slip clutch 98 being provided to permit operation without limit switches.

The various movements which incorporate motor or electrical drives are manually controlled through conveniently located switches in control box C.

Although not illustrated, a suitable receptacle may be provided within frame 22 under platform 26 to catch any epoxy which drips from the motor stator M.

The above description has been directed to a preferred form of this invention. It is to be understood, however, that the concepts of this invention may be practiced by use of other structure. Thus, for example, elevation means other than pinion and screw assemblies may be utilized where suitable. Similarly, L-shaped bracket assembly 16 may be vertically adjusted by means other than the crank assembly illustrated herein. Still further other forms of platforms may be used than the specifically described platforms 26, 26A. Likewise other modifications will become apparent to those skilled in the art when given the teachings of this invention.

Use of the above described apparatus results in a treated machine component which in itself has novel characteristics. These characteristics are derived primarily from the fact that the components, such as stator windings, are not simply coated but are actually completely impregnated and encapsualted in such an effective manner that rewound motors, for example, would actually be superior to new motors formed of conventional structure. In this respect FIGS. 10-11 illustrate cross-sections of portions of conventional prior art motor stators. As indicated therein, the conventional motor stator 100 includes a metal casing 102 provided with a series of slots 104 in which sets of windings 106 are disposed separated by slot liners 128. The windings are arranged in individual phase groups. For example, with a 480 volt motor there would be 480 volts between each phase. For proper operation it is necessary that the individual phases be insulated from each other. This is accomplished by the inclusion of phase barrier material 108 between each phase which is also used to properly orient the phases of the end turns. Where the windings have been treated in a conventional manner as by coating with a varnish, the varnish material 110 is provided generally around the wires in individual phases. With such conventional motors, however, air pockets or dead air spaces 112 result both in the slots and within each phase. This occurs not only from an insufficient amount of coating material being applied but also because the presence of heat causes the creation of air spaces with respect to varnish. The various windings or phases are mounted in proper orientation by lacing material 112. Generally an extensive amount of such lacing is provided to assure that the windings will be properly arranged and particularly that the individual wires in the windings of one set are out of contact with wires from another set since the sets must be insulated from each other.

FIGS. 12-13 illustrate an improved motor stator 120 in accordance with this invention. As indicated therein because of the method of application of the epoxy, the windings are not simply coated but are totally impregnated and encapsulated and the incividual phases thus have a homogeneous epoxy shell 122 of insulating material completely therearound. Accordingly, because of the thorough encapsulation the inclusion of conventional phase barrier material is eliminated. With the practice of the invention such phase barrier material for the end turns is unnecessary because the epoxy itself functions as the material due to its insulative characteristics. For example, the insulation provided on the individual wires themselves initially serves to keep them out of contact and subsequently the epoxy works its way between the wires for long lasting insulation. Further, the hard shell formed by the epoxy functions to orient the phases and keep the coils from moving thus eliminating that purpose of the phase barrier material. Moreover, if such phase barrier material were provided its inclusion would hamper the encapsulation process. Still further because there is no longer any phase barrier material for the end turns and the encapsulation automatically results from use of the inventive process, when a motor is rewound the winding operation is much more economical and quicker than conventional processes which would require phase barrier materials to be inserted between the phase groups. A further advantage of the encapsulation process is that a minimal amount of lacing 124 is utilized only at spaced locations for orienting the windings in the desired position. In this respect lacing is not required to assure that the wires of the individual phase groups are out of contact with each other since the epoxy achieves this function. Although the amount of lacing in prior art arrangements varies it is believed that use of the invention would result in reducing the amount of lacing by about 50%. The resultant encapsulated motor stator 20 has a number of distinct advantages over the prior art. For example, a suitable selected epoxy would result in a homogeneous shell having a tensile strength of at least 10,000 psi. Further, as is apparent from FIGS. 12 and 13, dead air space is completely eliminated in the slots becasue the slots are totally filled with the epoxy with the epoxy working its way through the open ends of slot liners 128 and filling all voids. Since an epoxy is chosen which is heat conductive and the epoxy is in contact with the metal casing 126, any tendency of the wires to heat up is minimized by the heat conductive material of the epoxy which maintains the motor running cool and thereby extends its wear life. Similarly, the individual wires and windings themselves are totally impregnated and encapsulated whereupon the resultant motor stator may be used in any environment or atmosphere or even under water.

FIG. 13, incidentally, illustrates the previously described temporary shielding material or release wax 99 before it is removed from casing 126 to thus remove undesired epoxy from casing 126 which might otherwise result from the encapsulation process.

The entire impregnation and encapsulation process is particularly advantageous over the more time consuming prior art processes. Thus while the prior art process might take about 6 hours for each successive "dip and bake", the inventive process could take ½ hour or less and including the preheating time could take only 1 hour. Where small motors are being treated the inventive process might be accomplished in only 15 minutes.

As is readily apparent from the above description, the invention results not only in an improved finished product but also in a method of obtaining such product wherein the process thereof may be quickly and economically accomplished by use of a particularly effective apparatus thereof.

I claim:

1. Apparatus for treating machine components such as for encapsulating windings of motor stators and the like comprising a frame, mounting means connected to said frame for holding the machine component exposed for the application of an encapsulating material thereto, inverting means connected to said mounting means for selectively moving said mounting means and the machine component to be held thereby about a first axis to one of two positions 180° apart, tilting means for selectively moving said mounting means about a second generally horizontal axis to a predetermined angular position for optimizing the application of the encapsulating material, rotation means for continuously rotating said mounting means about a third axis while the encapsulating material is being applied and hardens, said first axis and said third axis being disposed in the same plane and generally perpendicular to each other, and said second axis being in a plane perpendicular to said plane of said first axis and said second axis.

2. The apparatus of claim 1 including means for linearly adjusting the position of said mounting means along an imaginary line intersecting the axis of rotation of said mounting means for permitting the component being treated to be generally disposed along said axis of rotation of said rotation means.

3. The apparatus of claim 1 wherein said mounting means includes a platform, said inverting means including a rotatably mounted shaft, said platform being mounted on said shaft for rotation thereon, stop means for said platform disposed 180° apart, and means for securing the component to said platform.

4. The apparatus of claim 3 wherein said mounting means further includes a support member mounted on said shaft, said platform being removably mounted to said support member for accommodating different size components by changing platforms therefor, said platform being channel shaped to accommodate the machine component therein, and said means for securing said component being straps secured to said platform.

5. Apparatus for treating machine components such as for encapsulating windings of motor stators and the like comprising a frame, said frame including mounting means for holding the machine component exposed for the application of an encapsulating material thereto, inverting means connected to said mounting means for selectively moving said mounting means about a first axis to one of two positions 180° apart, tilting means for selectively moving said mounting means about a second axis to a predetermined angular position for optimizing the application of the encapsulating material, rotation means for continuously rotating said mounting means about a third axis while the encapsulating material is being applied and hardens, said rotation means comprising an L-shaped bracket having a generally vertical leg and a generally horizontal leg, motor means connected to said generally vertical leg for rotating said bracket, and said mounting means being connected to said generally horizontal leg.

6. The apparatus of claim 5 including a sleeve mounted over said generally vertical leg, said motor means being connected to said sleeve, means for moving said generally vertical leg in said sleeve, and means for selectively locking said generally vertical leg to said sleeve.

7. The apparatus of claim 6 wherein said means for moving said generally vertical leg includes a crank mechanism having a fixed housing connected to said sleeve and a generally vertically movable member in said housing and connected to said bracket, said sleeve having at least one aperture therethrough, said generally vertical leg having spaced apertures therein for alignment with said sleeve aperture, and a locking member for insertion into said sleeve aperture and a respective aperture in said generally vertical leg to comprise said locking means.

8. The apparatus of claim 7 including a sight marker on one of said crank housing and said sleeve along the axis of rotation of said rotation means whereby the center line of the component may be visually aligned with said axis of rotation of said rotation means, and said sleeve and said generally vertical leg being of complementary non-circular cross-section.

9. The apparatus of claim 8 wherein said inverting means includes a first support member mounted on said generally horizontal leg, a rotatable shaft mounted in said first support member, said mounting means including a second support member mounted on said shaft, a channel shaped platform removably mounted on said second support member whereby said platform may be rotated with respect to said first support member, sets of stop means associated with said platform disposed 180° apart for selectively mounting said platform in one of two diametrically opposed positions, and fastening means connected to said platform for holding the component thereon.

10. Apparatus for treating machine components such as for encapsulating windings of motor stators and the like comprising a frame, said frame including mounting means for holding the machine component exposed for the application of an encapsulating material thereto, inverting means connected to said mounting means for selectively moving said mounting means about a first axis to one of two positions 180° apart, tilting means for selectively moving said mounting means about a second axis to a predetermined angular position for optimizing the application of the encapsulating material, rotation means for continuously rotating said mounting means about a third axis while the encapsulating material is being applied and hardens, said tilting means comprising a generally U-shaped bracket having a bight portion and a pair of legs, said legs being pivotally mounted to said frame, elevating means connected to said bracket remote from the pivotal connection of said bracket to said frame for raising and lowering said bracket, and said rotation means being connected to said bight portion of said U-shaped bracket.

11. The apparatus of claim 10 wherein said elevating means comprises pinion and screw means connected between said frame and said U-shaped bracket, the maximum extension of said pinion and screw means being arranged for disposing said U-shaped bracket in a generally horizontal position, and the maximum retraction of said pinion and screw means being arranged for disposing said U-shaped bracket at an angle of about 45° from the horizontal.

12. The apparatus of claim 11 wherein said rotation means includes an L-shaped bracket having a generally vertical leg and a generally horizontal leg, a sleeve mounted over said generally vertical leg, motor means mounted to said bight of said U-shaped bracket and connected to said sleeve for rotating said L-shaped bracket, the diameter of revolution of said generally vertical leg being less than the distance between the legs of said U-shaped bracket, a crank mechanism having a fixed housing connected to said sleeve and a movable member means including a first support member mounted on said generally horizontal leg, said inverting means including a rotatable shaft mounted in said support member, a second support member mounted on said shaft, a platform removably mounted to said second support member for rotation therewith, stop means between said first and second support members for locking said platform in one of said two positions 180° apart, and fastening means connected to said platform for securing the component thereto.

13. Apparatus for treating machine components such as for encapsulating windings of motor stators and the like comprising a frame, mounting means connected to said frame for holding the machine component exposed for the application of an encapsulating material thereto, rotation means connected to said frame and to said mounting means for continuously rotating said mounting means about an axis while the encapsulating material is being applied and hardens, said rotating means comprising a bracket having a generally vertical leg and a generally horizontal leg, motor means connected to said generally vertical leg for rotating said bracket, said mounting means being connected to said generally horizontal leg, including inverting means, said inverting means including a first support member mounted on said generally horizontal leg, a rotatable shaft mounted in said first support member, said mounting means including a second support member mounted on said shaft, a channel shaped platform removably mounted on said second support member whereby said platform may be rotated with respect to said first support member, sets of stop means associated with said platform disposed 180° apart for selectively mounting said platform in one of two diametrically opposed positions, and fastening means connected to said platform for holding the component thereon.

14. Apparatus for treating machine components such as for encapsulating windings of motor stators and the like comprising a frame, mounting means connected to said frame for holding the machine component exposed for the application of an encapsulating material thereto, rotation means connected to said frame and to said mounting means for continuously rotating said mounting means about an axis while the encapsulating material is being applied and hardens, said rotating means comprising a bracket having a generally vertical leg and a generally horizontal leg, motor means connected to said generally vertical leg for rotating said bracket, said mounting means being connected to said generally horizontal leg, said mounting means including a platform, inverting means, said inverting means including a rotatably mounted shaft, said platform being mounted on said shaft for rotation thereon, stop means for said platform disposed 180° apart, and means for securing the component to said platform.

15. The apparatus of claim 14 wherein said mounting means further includes a support member mounted on said shaft, said platform being removably mounted to said support member for accommodating different size components by changing platforms therefor, said platform being channel shaped to accommodate the machine component therein, and said means for securing said component being straps secured to said platform.

16. The apparatus of claim 13 including inverting means connected to said mounting means for selectively moving said mounting means and the machine component held thereon about an axis perpendicular to said axis of said rotation means to one of two positions 180° apart, and tilting means for selectively moving said mounting means about a horizontal axis to a predetermined angular position for optimizing the application of the encapsulating material.

17. Apparatus for treating meachine components such as for encapsulating windings of motor stators and the like comprising a frame, mounting means connected to said frame for holding the machine component exposed for the application of an encapsulating material thereto, tilting means for selectively moving said mounting means about a first axis to a predetermined angular position for optimizing the application of the encapsulating material, rotation means for continuously rotating said mounting means about a second axis while the encapsulating material is being applied and hardens, said tilting means comprising a bracket having a bight portion and a pair of legs, said legs being pivotally mounted to said frame, elevating means connected to said bracket remote from the pivotal connection of said bracket to said frame for raising and lowering said bracket, and said rotating means being connected to said bight portion of said bracket.

18. The apparatus of claim 17 wherein said rotation means includes a further bracket having a generally vertical leg and a generally horizontal leg, a sleeve mounted over said generally vertical leg, motor means mounted to said bight of said bracket and connected to said sleeve for rotating said further bracket, the diameter of revolution of said generally vertical leg being less than the distance between the legs of said bracket, a crank mechanism having a fixed housing connected to said sleeve and a movable member means including a first support member mounted on said generally horizontal leg, said inverting means including a rotatable shaft mounted in said support member, a second support member mounted on said shaft, a platform removably mounted to said second support member for rotation therewith, stop means between said first and second support members for locking said platform in one of said two positions 180° apart, and fastening means connected to said platform for securing the component thereto.

19. The apparatus of claim 17 including means for lineraly adjusting the position of said mounting means along an imaginary line intersecting the axis of rotation of said mounting means for permitting the component being treated to be generally disposed along said axis of rotation of said rotation means.

20. The apparatus of claim 17 wherein said mounting means includes a platform, inverting means, said inverting means including a rotatably mounted shaft, said platform being mounted on said shaft for rotation thereon, stop means for said platform disposed 180° apart, and means for securing the component to said platform.

21. The apparatus of claim 20 wherein said mounting means further includes a support member mounted on said shaft, said platform being removably mounted to said support member for accommodating different size components by changing platforms therefor, said platform being channel shaped to accommodate the machine component therein, and said means for securing said component being straps secured to said platform.

22. Apparatus for treating machine components such as for encapsulating windings of motor stators and the like comprising a frame, mounting means connected to said frame for holding the machine component exposed for the application of an encapsulating material thereto, inverting means connected to said mounting means for selectively moving said mounting means and the machine component to be held thereby about a first axis to one of two positions 180° apart, rotating means for continuously rotating said mounting means about a second axis while the encapsulating material is being applied and hardens, said mounting means including a platform, said inverting means including a rotatably mounted shaft, a support member being mounted on said shaft for rotation therewith, said platform being removably mounted to said support member whereby said support member is capable of interchangeably accommodating different size platforms, and means for securing the component to said platform.

* * * * *